United States Patent [19]
Promeyrat

[11] 4,230,027
[45] Oct. 28, 1980

[54] RECIPROCATING PISTON

[75] Inventor: Maurice J. Promeyrat, Sevran, France

[73] Assignee: Societe Civile Promeyrat-Casteilia-Techniques Nouvelles du Moteur, Gagny, France

[21] Appl. No.: 891,200

[22] Filed: Mar. 29, 1978

[30] Foreign Application Priority Data

Mar. 28, 1977 [FR] France .................. 77 09155

[51] Int. Cl.³ ...................... F16J 1/02; F16J 1/08
[52] U.S. Cl. .................................. 92/159; 92/223
[58] Field of Search ............... 92/159, 158, 162, 182, 92/223, 192; 123/193 P

[56] References Cited

U.S. PATENT DOCUMENTS

| | | | |
|---|---|---|---|
| 2,344,416 | 3/1944 | Scheibe | 92/192 |
| 2,410,405 | 11/1946 | Cornelius | 92/223 X |
| 2,438,243 | 3/1948 | Zoromskis | 92/192 X |
| 3,396,976 | 8/1968 | Reinhoudt et al. | 92/162 R |
| 3,463,057 | 8/1969 | Packard et al. | 92/182 X |
| 3,721,163 | 3/1973 | Hill et al. | 92/158 |
| 4,048,975 | 9/1977 | Urquhart | 92/158 X |
| 4,075,934 | 2/1978 | Wacker et al. | 92/159 |
| 4,086,844 | 5/1978 | Homuth | 92/159 |

FOREIGN PATENT DOCUMENTS 752329  7/1956  United Kingdom ............ 92/158

*Primary Examiner*—Irwin C. Cohen
*Attorney, Agent, or Firm*—J. Harold Nissen

[57] ABSTRACT

This reciprocating piston, particularly for heat engines, compressors, comprises at least one upper bead the side surface or periphery whereof presents projecting portions and recessed portions. The projecting portions of this periphery have an initial diameter, before running-in, such that the initial diametrical clearance between the periphery of the upper bead and the cylinder, cold, is substantially equal to half the clearance usually provided between the conventional upper bead and cylinder, so that, during the running-in, the projecting portions of the upper, pressed against the inner wall of the cyliner, may contract and be compressed in the recessed portions which absorb them.

Further, the piston presents at least one cavity opening on the periphery of the first bead of the piston and at least one mobile piece partially occupying this cavity and which moves therein due to the movement of the piston, to prevent, without other deterioration, any considerable deposits of calamine.

3 Claims, 2 Drawing Figures

RECIPROCATING PISTON

BACKGROUND OF THE INVENTION

The present invention relates to a reciprocating piston forming the essential part of numerous heat engine, such as an automobile vehicle engine, a compressor, etc.

Heretofore known pistons generally comprise at least one upper bead having a side surface or periphery which is smooth or generally more or less deeply threaded in order to retain oil facilitating the sliding movement of the piston. With these pistons, it is often noted that wear at the level of the first ring, when it is present, (some pistons of compressors do not comprise any ring) increases with the rise in the power per liter of the engine. Consequently despite all the development of modern technique, mass-produced automobile vehicles comprise reliable engines capable of restoring only 15 to 20% of the potential power of the fuel used. In the case of racing cars, the engines allow only a maximum of 35% of the power of the fuel to be recovered. This is due notably to the excessive friction of the piston which corresponds to half the total friction of an engine, this friction alone constituting a very serious barrier against the increase of the yield.

This undesirable excessive friction is due to the negative action of the driving fluids which exert a pressure on the or each ring of the piston, said pressure tending to apply said rings very strong against the inner wall of the cylinder.

SUMMARY OF THE INVENTION

It is an object of the present invention to remedy these drawbacks by providing a piston of very simple design by means of which the alternate compressions and decompressions of the driving fluid, exerted more particularly at the first piston segment, are considerably reduced, this bringing about essentially a reduction in the friction of this ring on the inner wall of the engine.

To this end, this reciprocating piston, particularly for heat engines, compressors, comprising at least one upper bead the side surface or periphery whereof presents projecting portions and recessed portions, is characterised in that the projecting portions of this periphery have an initial diameter, before running-in, such that the initial diametrical clearance, between the periphery of the upper bead and the cylinder, cold, is substantially equal to half the clearance usually provided between the conventional upper bead and cylinder, so that, during running-in, the projecting portions of the upper bead, pressed against the inner wall of the cylinder, may contract and be compressed in the recessed portions which absorb them.

Thus, during the period of running-in or "adaptation" of the piston in its cylinder, the periphery of the upper bead, pressed against the inner wall of the cylinder during the strongest expansions, may contract, the recessed portions absorbing the packings or compressings of the projecting portions and lubricating them with the driving fluids which they retain (fuel, gas, lubricant).

Furthermore, as the periphery of the upper bead of the piston according to the invention is closer to the inner wall of the cylinder, with respect to the case of a conventional piston upper bead, the formation of a cushion of pressurised fluids between the upper bead and the cylinder is thus promoted, which cushion creates very substantial limitations of the oscillations or balancings of the piston. Consequently the skirt top of said piston is less pressed against the cylinder and no longer risks the seizures which are still frequently met with at this spot in the conventional pistons, especially during the running-in period. This limitation simultaneously causes a reduction in the noise resulting from all the consequences of said balancing or oscillation. It should also be specified that the closeness of bead and cylinder beneficially amplifies the cooling of the piston head, whilst it reduces the passage of the driving fluids between piston and cylinder, above the first segment. The driving fluids then have less tendency to infiltrate between the outer periphery of the ring and the inner wall of the cylinder, and they circulate thereafter in smaller quantities through the operational clearances between the rings, the piston and the cylinder. This results in particular, at the same time as a reduction of the infiltration of the driving fluids into oil casing, in a reduction in the average pressure of these fluids, particularly on the rear of the first ring which consequently slides on the inner wall of the cylinder with less friction, braking the piston less. The connecting rod assembly thus furnishes fewer stresses during the admission and compression of the fresh fluids as well as during exhaust of the burnt fluids, whilst during the driving thrust due to the combustion, this connecting rod assembly is animated with less holding back.

At the same time, during the expansion phase, in the case of an explosion engine, the accelerated movement of the piston and the slower filling of the operational clearances as far as the rear of the first ring brings about an attenuation of the rebounding of the fluid upon the explosion (shock wave) particularly on the valves, this attempting to reduce their anarchic detachment, particularly in the case of load at low running speeds. In this way the knocking of these valves and the losses of power resulting therefrom are reduced.

Furthermore, the sliding without "braking" of the first piston ring ensures for the engine a flexibility from which all the transmission elements up to the last gear wheel benefit, and makes each manually driven vehicle exceptionally agreable to use.

According to a further feature of the invention, the piston presents at least one cavity opening on the periphery of the first bead of the piston and at least one mobile piece partially occupying this cavity and which moves therein due to the movement of the piston, to prevent, whithout other deterioration, any considerable deposits of calamine, the movement of said piece simultaneously causing a ventilation and consequently a cooling action around said piece.

This cavity provided in the first bead of the piston makes it possible to maintain a space of constant volume, at equal temperature, this space being accessible to the driving fluids under pressure or not around the first bead. This results in that, by being diverted in this space, these fluids have their movements slowed down in the direction of or coming from the first ring. This space is more or less large depending on the necessary protection at the first ring.

The piston according to the invention, used in heat engines and other reciprocating piston engines, enables the yield, fuel saving, flexibility, silence, antipollution and reliability to be considerably improved.

BRIEF DESCRIPTION OF THE DRAWINGS

The invention will be more readily understood on reading the following description with the reference to the accompanying drawings, in which.

DESCRIPTION OF THE PREFERRED EMBODIMENT

Figure 1:
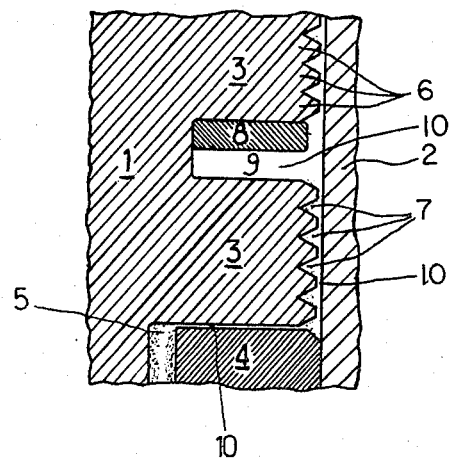
FIG. 1 is a view in partial longitudinal section of a piston according to the invention reciprocating in a cylinder.
Figure 2:
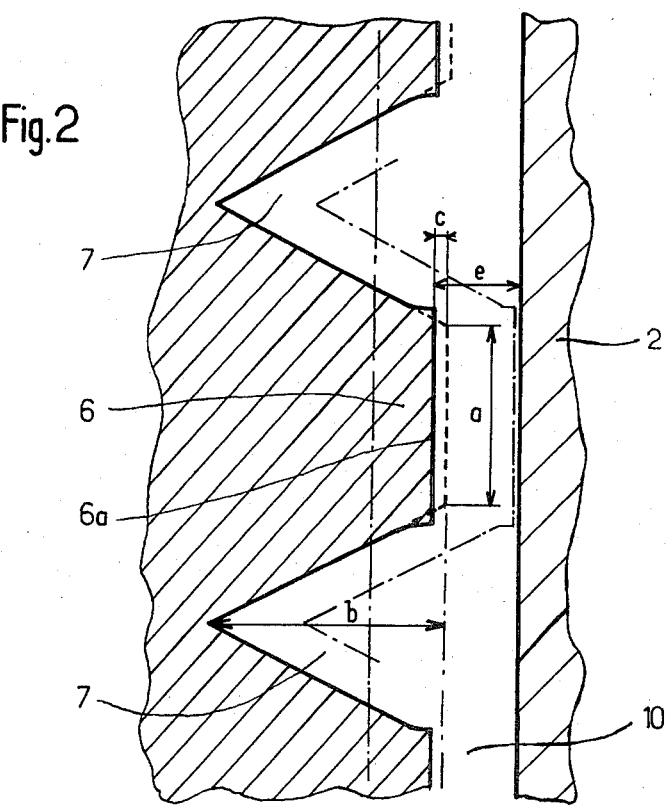
FIG. 2 is a view in longitudinal section, on a larger scale, of part of the periphery of the piston of FIG. 1.

Referring now to the drawings, FIGS. 1 and 2 partly show a piston 1 according to the invention after a long running-in period and at an average operating temperature. This piston is at the end of compression, 1 cm from its top dead centre. This piston is represented by a part of its first or upper bead 3 and it is animated by a reciprocating movement inside a cylinder 2, shown partly. Beneath the first upper bead 3 is partly shown the first ring 4 of the piston, this ring being housed in a transverse annular groove 5. According to the invention, the piston 1 presents on its periphery alternating projecting portions 6 and recessed portions 7. Portions 6 may be constituted by threads of trapezoidal cross section separated by triangular-sectioned grooves 7 constituting the recessed portions. Calamine is usually deposited in these grooves (indicated by dots in the Figure). The threads 6 and grooves 7 may be obtained by a conventional threading operation made on the periphery of the first bead 3.

Whilst on reciprocating pistons the beads have such dimensions that they can never come into contact with the wall of the cylinder, the piston 1 according to the invention is chosen so that the periphery of its upper bead 3 cold, has an initial diameter, before running-in, such that the diametrical clearance between the upper bead 3 of the piston and the cylinder is substantially equal to half of the clearance usually provided in the corresponding case of a conventional piston. FIG. 2 shows in solid lines the section of the periphery of the bead 3, cold, and in broken lines this section in the maximum conditions of expansion of this bead. This Figure also shows in broken lines the initial section of the periphery of the bead 3, before running-in.

The periphery of the bead 3 shown in FIG. 2 is that of a first piston bead which is shaped by itself, particularly by the packing of its teeth apices 6a, pressed by the driving fluids against the inner wall of the cylinder 2, mainly during the multiple expansions of this first bead during the running-in period. The result of this is that the clearance between the apices 6a of the trapezoidal teeth or ribs 6 and the inner wall of the cylinder 2 is only, at a mean operating temperature, about one third of the normal clearance between the cylinder and the first bead of a conventional piston in the same conditions. For example, in the case of a reciprocating piston of diameter 75 mm, mounted in a 4-stroke engine, a first self-adapted bead of a piston according to the invention, has on average a diameter larger by 0.2 mm than that of a conventional piston. The diametrical clearance 2e of this self-adapted bead is thus included between 0.3 mm, cold, and 0 in the maximum conditions of expansion of the bead.

In the case of a 2-stroke engine, the values indicated above are generally divided by 2 whilst they are approximately the same where a Diesel engine is concerned. For the reciprocating pistons of the other engines, particularly for those of compressors, the maximum clearance, cold, of the self-adapted bead 3 is also mainly a function of these maximum expansions. Know the clearances, cold, of the first beads 3 of the conventional pistons with their cylinders (in the perfectly run-in engines) and taking into account the possible deposits of calamine, on themselves and in the cylinder tops, it is easy to provide the initial diametrical dimension of any first self-adaptable bead. In fact, this dimension is obtained by adding a few hundredths of mm to the diametrical dimension of a first bead of a corresponding conventional piston, also increased by the diametrical thickness of the above-mentioned calamine deposits. It then suffices to give the new bead the possibility of contraction by making on its periphery cavities capable of accomodating the driving fluids (fuel, gas, lubricant) and also adapted to receive the packings or compressings lubricated by these fluids (therefore without risk of seizure) coming from the projections (around the cavities) pressed against the cylinder, mainly at the moment of the highest heat rises of the engine. Thus each piston according to the invention presents, above its first ring 4, between its periphery and the inner wall of cylinder, a channel whose the small maximum width is obtained more or less rapidly, as a function of the malleability of the projecting portions 6 which are provided to be more or less large, resistant or the like, according to the speed of desired running-in.

In the case of the piston shown in the drawing, it is question of a periphery of diameter, cold, between the apices 6a of the threads or ribs 6 constituting the projecting portions, which is greater, after a maximum conditioning of the engine, by 0.05 mm than what it is, cold, at the same spot. The initial periphery was obtained by a simple threading producing trapezoidal threads 6 having an initial width a of about 0.3 mm and grooves 7 having a depth b of about 0.4 mm. Consequently, in view, in particular, of the considerable malleability of such a periphery, its positioning begins as from the first rotations of the engine and it continues, immediately then increasingly bringing numerous improvements to this engine, particularly concerning the yield, fuel-saving, flexibility, pollution and reliability. It may be said that the cause of these beneficial effects results mainly from the narrowness of the channel of width e made between the apices 6a of the projecting portions 6 and the inner wall of the cylinder 2.

In fact, this channel of narrow width considerably slows down the movement of the driving fluids at ring 4, thus limiting the quantity of these fluids in circulation, compression or depression, particularly at the upper corner of the ring 4 in tangency with the cylinder 2, then around and particularly to the rear of this ring. In other words, the phenomenon of contradiction produced by ring 4 is thus less amplified, i.e. this piece is both beneficial in view of the seal which it procures by its simultaneous contact with the piston 1 and the cylinder 2, and harmful due to its friction thereon. It is known, in fact, that half of the frictions of an engine are located between cylinder and piston and that the frictions increase with the load and are proportional to the square of the running speed. This shows all the interest of the piston according to the invention, which makes it possible considerably to reduce the friction of the first ring without reducing its seal, increasingly and proportionally to the rise in the running speed since the width e of the channel between piston and cylinder may reduce to 0, as a function of the maximum expansion of the periphery of the bead 3, which expansion itself depends directly on the load and the rise in the running speed.

Furthermore, the same width e of the channel between piston and cylinder, compared with a conventional piston, causes a limitation of the oscillations of the piston about its axis and its other balancings consecutive mainly to the explosion of the driving fluids and to the impulse changes of the connecting rod assembly. The approach of the periphery of the piston according to the invention to the inner wall of the cylinder 2 also produces a cushion of driving fluids therebetween, the pressure of which is, in particular, proportional to the approach. Thus, the stresses of the piston skirt top against the cylinder during the above-mentioned explosions and changes of impulses, are reduced to a maximum, mainly during the period of running-in, during which the risks of seizure are still too frequent precisely at the conventional piston skirt top. Similarly, the operational noises usually due to the abnormalities described are attenuated.

According to a complementary feature of the invention, a decompression chamber 9 is provided in the periphery of the first bead 3 above the ring 4, in which chamber is housed a piece 8 which moves freely therein due to the movements of the piston. The cavity 9 is constituted by an annular transverse groove in which is housed a split ring 8 comparable with a shim or the flat part of a springed scraper. In FIG. 1, the split ring 8 is shown applied against the bottom of its groove 9 and against the upper wall of this groove. The operational clearances 10 are shown by white spaces between the different elements mentioned above.

The decompression chamber 9 which is thus located on the path of the driving fluids in the direction of or coming from the first ring 4 contributes to additionally limiting the negative action of these driving fluids at this first segment. In this chamber, the permanence of the volume is ensured by the reciprocating of the ring 8 which is provided to prevent, in this chamber 9, any deposit of calamine without other deterioration. The reciprocating of the ring 8 against the bottom of the groove 9, between the top and bottom thereof, is provoked by the combining of the movements of the piston with those of the driving fluids. Of course, further to the frequent variation of the clearance e between piston and cylinder, during running of the engine the free volume of the groove 9 constitutes a regulator whose efficiency is particularly beneficial, at the first ring, during starting, low temperature functioning and generally at all moments of load variations of an engine. It should also be specified that, however small it is, the reciprocating of the ring 8 creates a ventilation, therefore a beneficial cooling of its surroundings.

In conclusion, it is seen that, if the simple approach of the new periphery of the piston head with its cylinder may suffice to bring considerable improvements, its coordination with the suitable decompression chamber 9 further increases certain of the advantages mentioned and especially allows highly elaborate engines to be created, functioning well both with the lowest and with the highest loads, at the lowest and highest running speeds.

As has been seen previously, the modified periphery constituted by the projecting portions 6 and the recessed portions 7 of the or each bead such as the upper bead 3 may be obtained by machining, for example, by milling with circular grooves and finishing to size with a conventional lathe tool. This periphery may also be totally or partly constituted, with a view in particular of a possible reinforcement, by one or more coatings (electrolytic or the like) or by one or more added pieces, inlayed or generally incorporated during the casting of the piston.

The periphery of the or each bead may be totally or partly coated with a chromium-plating or nickel-plating or other protective coating, with a view to reducing its possible wear, due in particular to the corrosion of the driving fluids or to the intermittent contact of the periphery with the cylinder in the highly elaborate engines.

Easy to industrialise, since its manufacture and cost price are similar to those of conventional pistons, the piston according to the invention may be obtained from stocks of said conventional pistons, by milling, in particular, the desired part and turning, if necessary and possible, the decompression chamber.

Finally, it should be noted that through all the advantages contributed by the present invention, the increase in power may facilitate the adaptation of the carburetors, the filters and other catalysts, consumers of power which will be more and more necessary to fight against the pollution of heat engines. Furthermore, due to the invention, and without other modification the present anti-pollution adjustment thereof will sometimes be improved but will especially be more stable, since the best functioning and good condition of certain pieces, influencing said adjustment, will be ensured and extended by said invention.

What I claim is:

1. A reciprocating piston for heat engines, compressors and the like including a cooperating piston and a cylinder, comprising:
   a piston body including an upper bead, said piston being provided with a transverse annular groove having an inner portion;
   a first ring housed in said transverse annular groove, said ring having an upper corner in tangency with the inner wall of said cylinder and a rear inner facing surface spaced from said inner portion of said transverse inner groove;
   said upper bead having on its periphery projecting ribs and recessed portions spaced from the inner wall of its said cooperating cylinder, said projecting ribs alternating with said recessed portions;
   said upper bead including a decompression chamber above said first ring, said ribs and recessed portions being above and below said decompression chamber, a ring piece housed within said decompression chamber and freely axially movable therein to cooperate with said first ring in response to the movement of said piston in said cylinder; and,
   the outer periphery of said ribs having a diameter related to the diameter of the inner wall of said cylinder such that the initial diametrical clearance between said outer rib periphery in its cold condition and said inner wall periphery of said cylinder is substantially equal to half the clearance usually provided with a conventional piston and said inner wall of said cylinder such that during running-in, said projecting ribs being pressed against the inner wall of said cylinder whereby said ribs may contract and be compressed in said recessed portions which absorb said projecting ribs, wherein for a reciprocating piston having a diameter of 75 mm, and when mounted in a four stroke engine, the diameter of a first self-adapted bead of said cooperating piston has a diameter larger by 0.2 mm than that of the conventional piston for said four stroke engine.

2. The piston as claimed in claim 1, wherein said projecting ribs form concentric circular threads, said threads each having a root portion in which two adjacent threads form concentric triangular-sectioned circular grooves separating said adjacent threads and the crest of said threads together with the pitch diameter thereof forming trapezoidally-shaped members in cross-section.

3. The piston as claimed in claim 1, wherein
the upper bead has a protective coating thereon selected from the group consisting of an electrolytic coating, a protective chromium plating, and a protective nickel plating.

* * * * *